United States Patent [19]
Kawamura

[11] Patent Number: 6,132,898
[45] Date of Patent: Oct. 17, 2000

[54] BATTERY WITH A CONDUCTIVE PLATE

[75] Inventor: Hiroshi Kawamura, Kyoto, Japan

[73] Assignee: Japan Storage Battery Co., Ltd., Kyoto, Japan

[21] Appl. No.: 08/955,115

[22] Filed: Oct. 21, 1997

[30] Foreign Application Priority Data

Oct. 21, 1996 [JP] Japan .................................. 8-278470

[51] Int. Cl.$^7$ .................................................. H01M 4/00
[52] U.S. Cl. .............................................. 429/94; 429/235
[58] Field of Search ..................... 429/233, 235, 429/241, 242, 94, 162, 127, 209; 29/2, 623.1, 623.4

[56] References Cited

U.S. PATENT DOCUMENTS

| | | | |
|---|---|---|---|
| 2,724,733 | 11/1955 | Hagspihl et al. | 29/2 |
| 3,695,935 | 10/1972 | Cromer | 429/94 |
| 4,105,832 | 8/1978 | Sugalski | 429/94 |
| 4,709,472 | 12/1987 | Machida et al. | 429/94 |
| 5,843,594 | 12/1998 | Cheong et al. | 429/94 |

FOREIGN PATENT DOCUMENTS 53-25839  3/1978  Japan .
59-78460  7/1984  Japan .

*Primary Examiner*—Maria Nuzzolillo
*Assistant Examiner*—Susy Tsang
*Attorney, Agent, or Firm*—Sughrue, Mion, Zinn, Macpeak & Seas, PLLC

[57] ABSTRACT

A band-like punching metal is made to be put on a positive electrode formed from band-like nickel fiber felt having a positive electrode active material carried therein. The positive electrode and a negative electrode are wound through a separator to thereby form an electricity generating element. In this occasion, the upper edge portion of the punching metal is projected from the upper end side of the electricity generating element so that an upper collector plate is welded to the upper edge portion of the punching metal.

2 Claims, 4 Drawing Sheets

BATTERY WITH A CONDUCTIVE PLATE

BACKGROUND OF THE INVENTION

1. Field of the Invention

The present invention relates to a battery using electrodes at least one of which is formed from a three-dimensional porous body such as a foamed metal, a nonwoven cloth metal, or the like, having an active material carried therein.

2. Description of the Related Art

In order to improve an active material filling density to increase a battery capacity, some electrodes use foamed metal or non-woven cloth-like metal. For example, a nickel-hydrogen secondary battery uses an positive electrode made of a foamed nickel (foamed metal), nickel fiber felt (non-woven metal) or the like. The foamed nickel may be created by plating urethane foam containing carbon to have conductivity with nickel and baking it to blow off the compositions of urethane and carbon to leave only the foamed metallic nickel. Such a foamed nickel constitutes a very porous three-dimensional body with a large number of nickel frames three-dimensionally coupled with one another in a network (mesh). The nickel fiber felt may be created by baking nickel slender fibers made by e.g. chattering vibration into a felt (nonwoven) cloth. Such a nickel fiber felt also constitutes a very porous three-dimensional body with a large number of nickel fibers three-dimensionally coupled with one another in a network (mesh). Therefore, if powder (non-aqueous) of nickel hydroxide which serves as an active material dispersed in a dispersant such as water is applied in these three-dimensional porous body and dried, a large quantity of active material can be surely carried in the gaps among a large number of frames or fibers coupled in a network to increase the filling density of the active material. This increases the battery capacity greatly.

Meanwhile, the three-dimensional porous body must collect current through a current collector of a metallic sheet for its connection to a terminal of a battery. However, it is difficult to connect the current collector to the three-dimensional porous body containing the active material directly by welding, because the active material hinders welding and the mechanical strength of the frames or fibers of the three-dimensional porous body is low.

Therefore, conventionally, a part of the three-dimensional porous body was previously pressed and was caused to carry the active material. The current collector was welded or press-fitted to the pressed area. Specifically, if the three-dimensional porous body is pressed, the frames of fibers of the pressed area is formed as a metallic sheet so that the active material is substantially not applied to the pressed area. For this reason, after the active material is carried on the three-dimensional porous body, the current collector can be welded to the pressed area, thus assuring the connection. In some cases, after the active material was once carried on the three-dimensional porous body, ultrasonic vibration is applied to an area of the three-dimensional porous body to remove the active material, and the current collector was welded to the removed area.

In some cases, belt-shaped steel which serves as a current collector was crimped on the entire surface of the three-dimensional porous body.

However, conventionally, as described above, with an area of the three-dimensional porous body pressed previously or the active material removed, the current collector must be welded or crimped on the three-dimensional body. In addition, since such a step was required for each of the electrodes, the productivity of the battery was attenuated.

Further, application of slight pressing force to the three-dimensional porous body crushes the frames or intimately couples the fibers with each other, and application of slight pulling force thereto extends the network portion to reduce the thickness of the entire three-dimensional porous body. This makes it impossible to carry the active material on the three-dimensional body. In addition, increasing the pulling force cleaves the three-dimensional body easily. Particularly, where the current collector is welded or crimped on an area of the three-dimensional porous body, when force is applied during the operation of assembling the battery or the vibration at the time of using the battery, the three-dimensional porous body is easily cleaved or cut at its welding part or crimping part. Moreover, when such a current collector is welded or crimped to a portion of the three-dimensional porous body, the electric resistance of the portion which separates from the current collector is increased.

SUMMARY OF THE INVENTION

It is an object of the present invention to provide a battery in which a conductive thin plate is attached to a three-dimensional porous body so that not only collection is made efficiently through the conductive thin plate but also connection to a battery terminal is made easily.

DETAILED DESCRIPTION OF THE INVENTION

Figure 1:
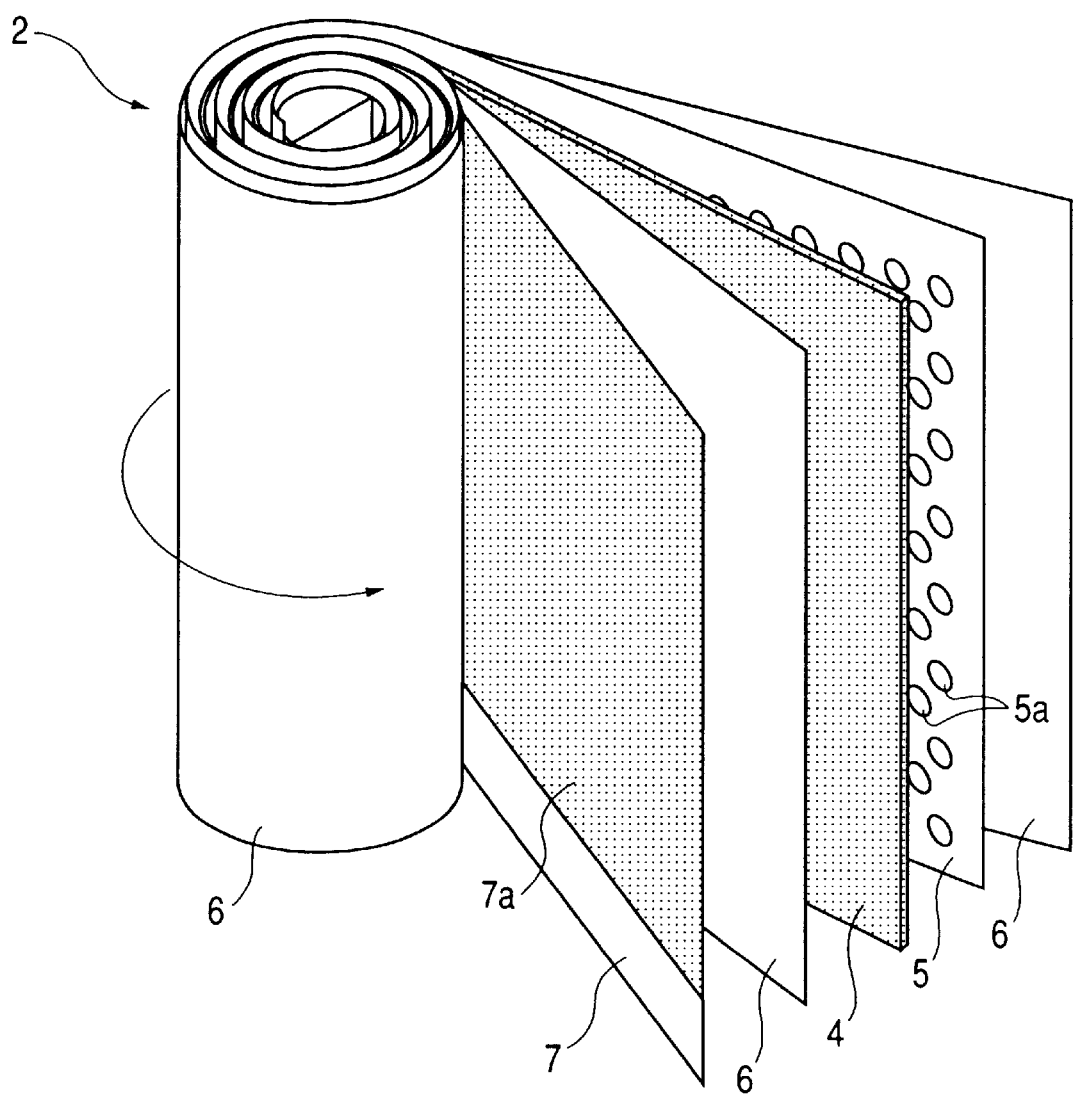
FIG. 1 is a perspective view showing a configuration of an electricity generating element of an embodiment according to the present invention.

Detailed description of the invention will be described as follows.

The present invention provides, a battery (1) in which: positive and negative electrodes are arranged so as to be adjacent to each other through a separator; and at least one of the positive and negative electrodes is formed from a three-dimensional porous body having an active material carried therein, in which a conductive thin plate is arranged so as to abut on from 50% to 100% of the area of an electrode plate in the electrode formed from the three-dimensional porous body having the active material carried therein, and one of end edge portions of the conductive thin plate is projected from an end portion of an electricity generating element.

According to the battery (1), because the three-dimensional porous body of the electrode abuts on the conductive thin plate so as to be electrically connected to the conductive thin plate, current collection can be made efficiently through the electrically conductive thin pate. Further, because the conductive thin plate is designed so that any one of end edge portions is projected from an end portion of the winding, or the like, of the electricity generating element, the current collector can be connected to the protrusion portion by means of resistance welding, or the like, so that connection to the terminal is made easily in the same manner as in the case of a sintering type electrode. Accordingly, because the step of preliminarily pressing a part of the three-dimensional porous body or removing the active material for each electrode to weld the current collector before winding, or the like, can be omitted, efficiency in production of the battery can be improved.

Further, there is provided a battery (2) in which: positive and negative electrodes are arranged so as to be adjacent to each other through a separator; and at least one of the positive and negative electrodes is formed from a three-dimensional porous body having an active material carried therein, characterized in that a conductive thin plate is arranged so as to abut on from 50% to 100% of the area of an electrode plate in the electrode formed from the three-dimensional porous body having the active material carried therein, and a lead portion is formed in the conductive thin plate so as to extend out from one of end edge portions of the conductive thin plate to the outside of an end portion of an electricity generating element.

According to the battery (2), because the three-dimensional porous body of the electrode abuts on the conductive thin plate so as to be electrically connected to the conductive thin plate, collection can be made efficiently through the conductive thin plate. Further, because the conductive thin plate is designed so that the lead portion is led out from any one of end edge portions, connection to the terminal, or the like, is made easily through the lead portion.

Further, in a battery (3) according to the present invention, the conductive thin plate defined in the above-mentioned battery (1) or (2) may have a plurality of opening holes in its surface abutting the electrode.

In the battery (3), because ion conduction due to the electrolyte between the electrodes through the conductive thin plate is secured through the plurality of opening holes, the inner resistance of the battery can be reduced.

Further, in a battery (4) according to the present invention, the conductive thin plate defined in the above-mentioned battery (3) is arranged integrally so that the three-dimensional porous body of the electrode on which the conductive thin plate abuts is interpenetrated into the respective opening holes.

According to the battery (4), because the three-dimensional porous body of the electrode interpenetrates into the respective opening holes of the conductive thin plate, electrical connection between the three-dimensional porous body and the conductive thin plate is made more securely. Further, when the three-dimensional porous body which expands easily and tears easily is integrated with the conductive thin plate, the handling of the battery can be made easily in the work of assembling the battery, or the like.

Further, in a battery (5) according to the present invention, the conductive thin plate defined in any one of the above-mentioned batteries (1) through (4) has a large number of protrusion portions which are formed on the surface abutting on the electrode so as to project toward the electrode side.

According to the battery (5), because the protrusion portions of the conductive thin plate interpenetrates into the three-dimensional porous body, the electrical connection between the three-dimensional porous body and the conductive thin plate is made more securely. Further, because the three-dimensional porous body is integrated with the conductive thin plate, the handling of the battery can be made easily in the work of assembling the battery, or the like. Furthermore, in the case where fin-like protrusion portions are provided in edges of the opening holes of the conductive thin plate, not only ion conduction is secured by the opening holes but also the conductive plate and the three-dimensional porous body interpenetrates into each other so that the conductive thin plate and the three-dimensional porous body can be integrated with each other more firmly.

Further, in a battery (6) according to the present invention, the electricity generating element defined in any one of the above-mentioned batteries (1) through (5) is of a winding type in which the positive and negative electrodes are wound through the separator and arranged helically so as to be adjacent to each other; and the conductive thin plate is arranged in the more inner circumferential side of the winding than the electrode on which the conductive thin plate abuts, and the winding start end of the conductive thin plate is displaced in a direction opposite the winding direction from the winding start end of the electrode on which the conductive thin plate abuts.

According to the battery (6), because the outer circumferential side of the winding start end (start end) of the conductive thin plate is covered with the three-dimensional porous body of the electrode, there is no risk that the start end of the conductive thin plate having some degree of stiffness may pierce the separator in the outer circumferential side and contact to the other electrode to cause short-circuiting. In addition, if the start end of the other electrode is displaced in a direction opposite the winding direction from the start end of the conductive thin plate, there is no risk that the start end of the conductive thin plate may contact to the other electrode to cause short-circuiting even in the case where the start end of the conductive thin plate pierces the separator in the inner circumferential side.

Further, in a battery (7) according to the present invention, an insulating layer is formed on a surface on the inner circumferential side of the winding in the vicinity of the winding start end of the conductive thin plate defined in the above-mentioned battery (6).

According to the battery (7), because the electrode on which the conductive thin plate does not abut uses a core having some degree of stiffness, the start end of the electrode is insulated by the insulating layer formed in the inner circumferential side surface of the conductive thin plate even in the case where the start end of the electrode pierces the separator in the outer circumferential side. Accordingly, there is no occurrence of short-circuiting.

Next, preferred embodiments according to the present invention will be described as follows referring to the accompanying drawings.

Figure 2:
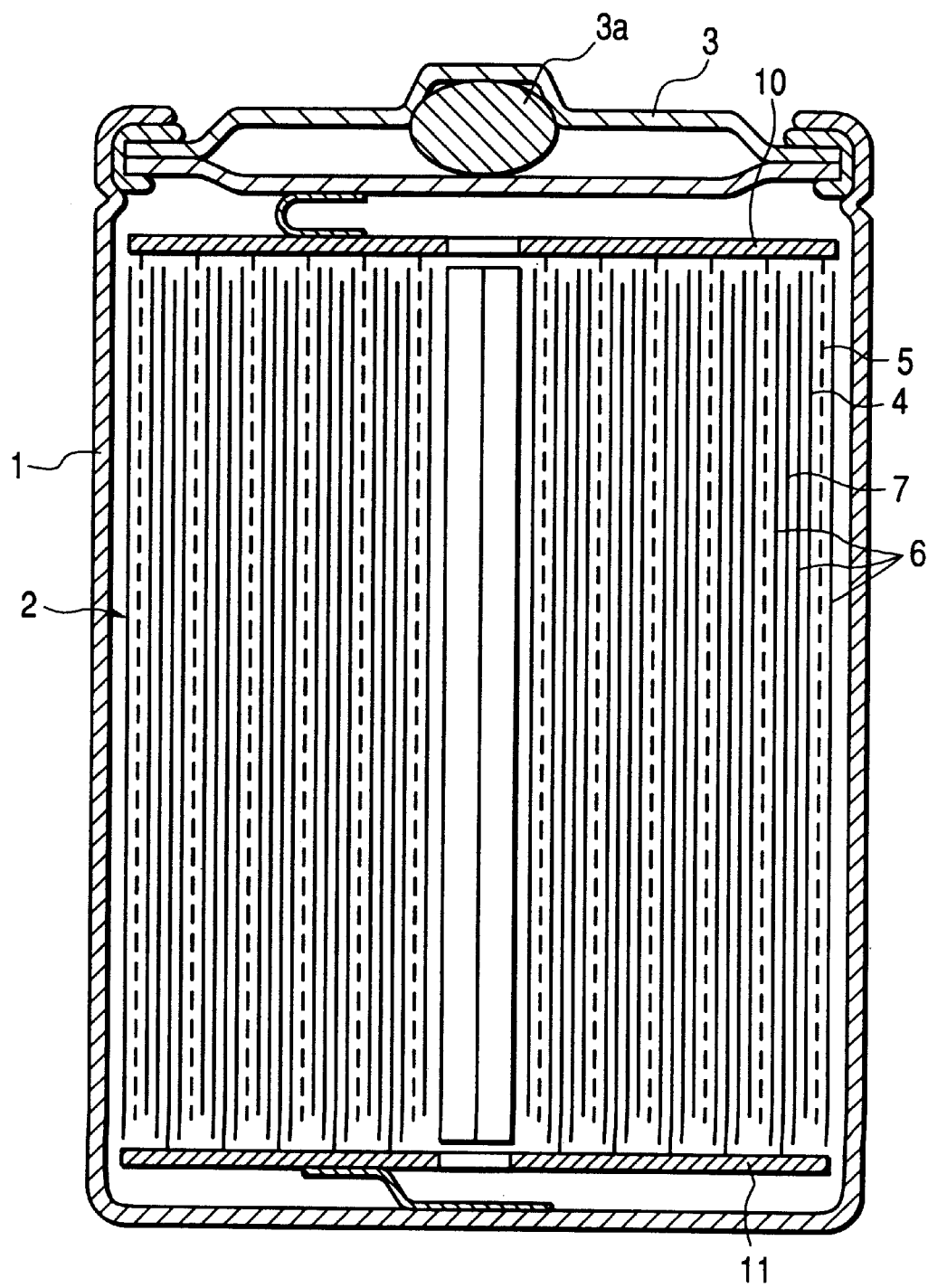
FIG. 2 is a vertical sectional view showing the configuration of a nickel-hydrogen secondary battery of an embodiment according to the present invention.
Figure 3:
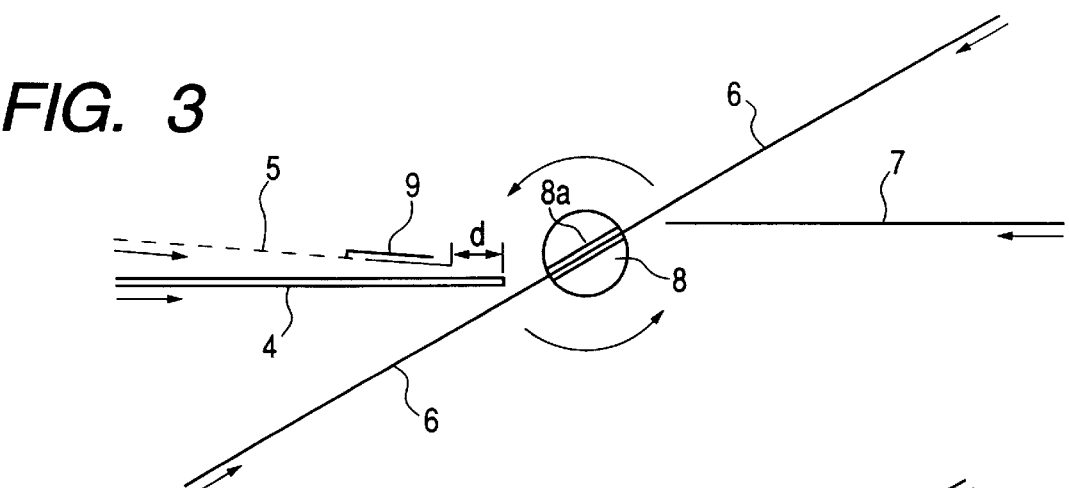
FIG. 3 is a view showing the first stage of an electricity generating element winding step of an embodiment according to the present invention.
Figure 4:
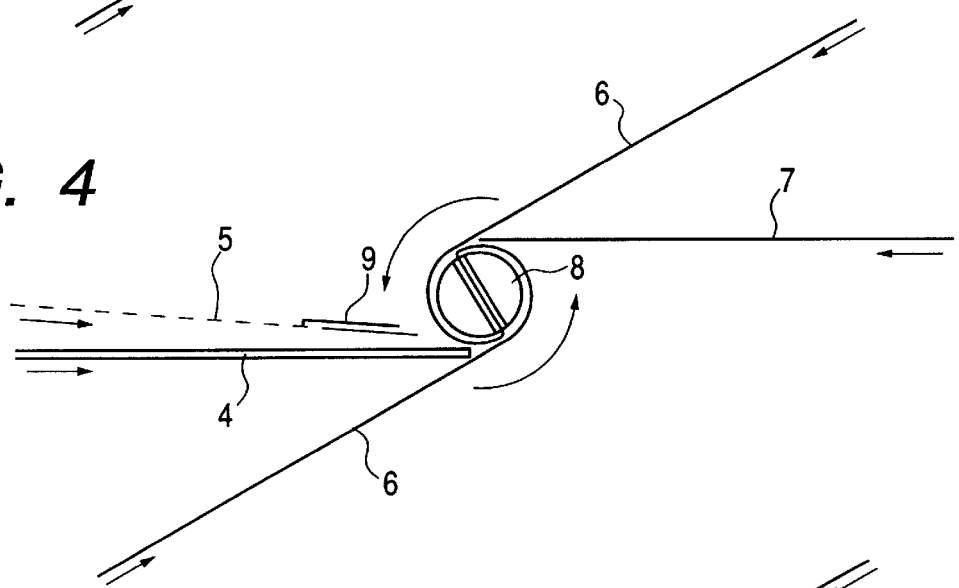
FIG. 4 is a view showing the stage in which the winding shaft has made a half rotation in the electricity generating element winding step of an embodiment according to the present invention.
Figure 5:
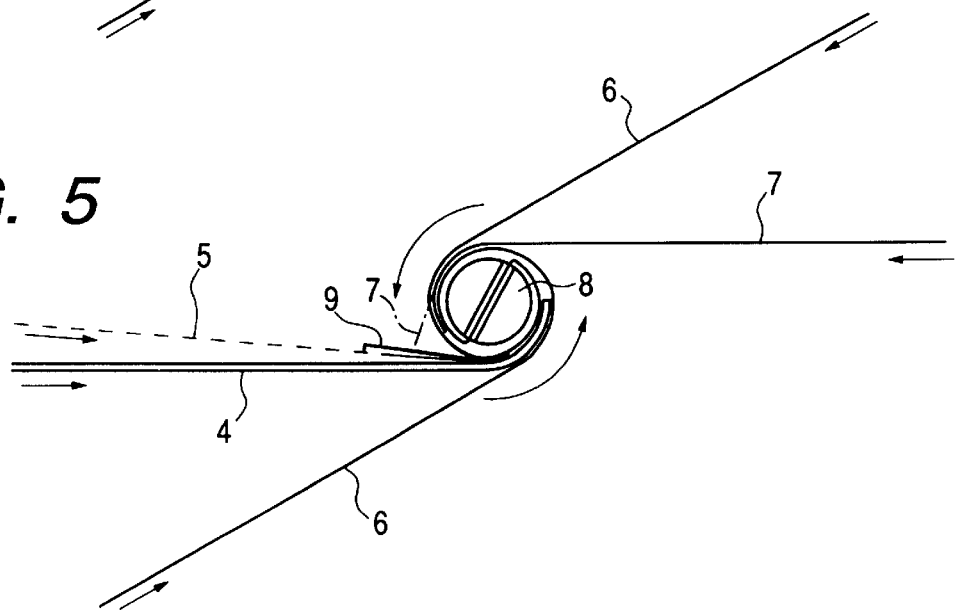
FIG. 5 is a view showing the stage in which the winding shaft has made one rotation in the electricity generating element winding step of an embodiment according to the present invention.
Figure 6:
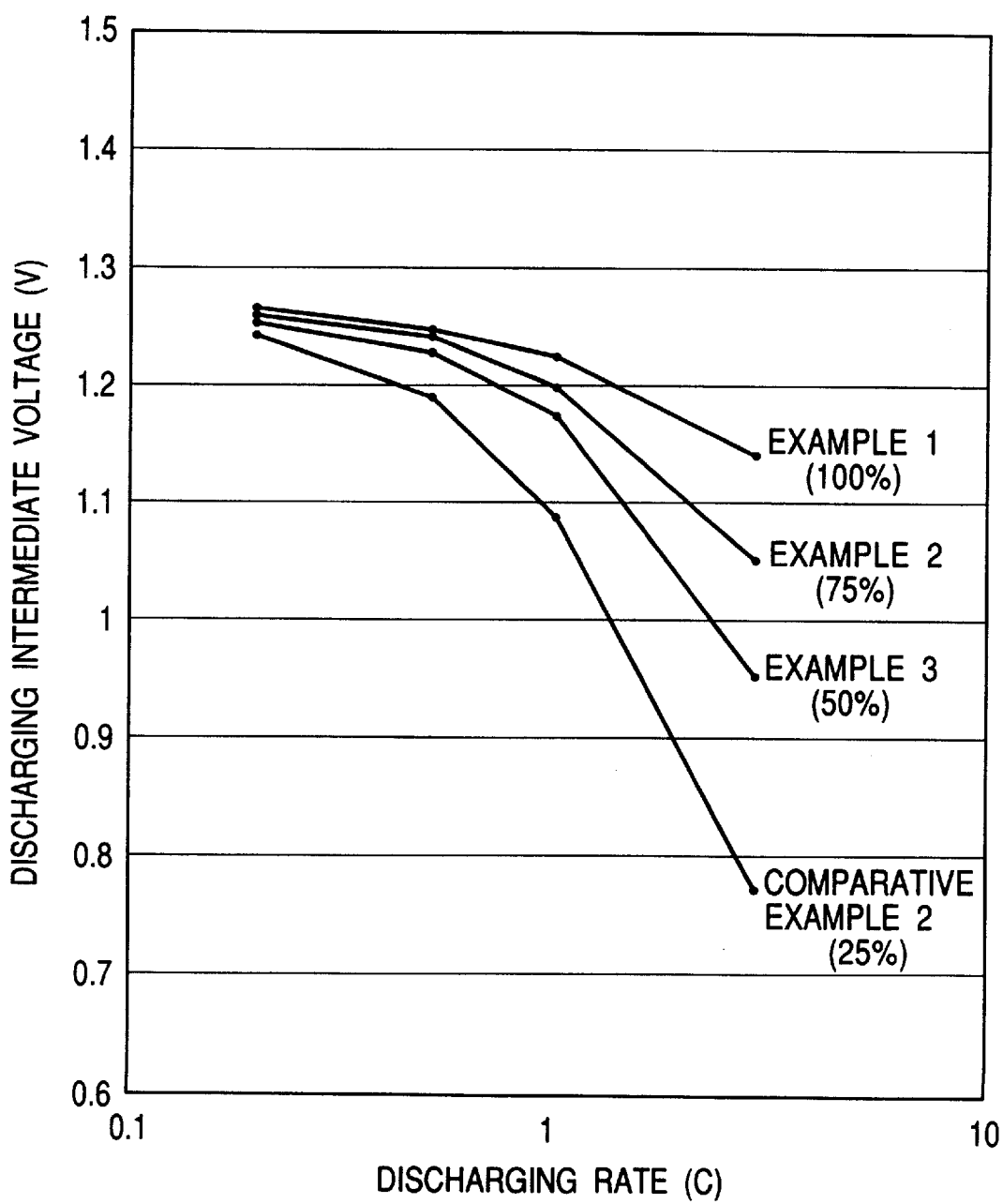
FIG. 6 is a view showing the results of comparison between embodiments of the present invention and comparative examples and showing the relation between discharging rate and discharge intermediate voltage.

FIG. 1 is a perspective view showing the configuration of an electricity generating element. FIG. 2 is a vertical sectional view showing the configuration of a nickel-hydrogen secondary battery. FIG. 3 is a view showing the first stage of an electricity generating element winding step. FIG. 4 is a view showing the stage in which a winding shaft has made a half rotation in the electricity generating element winding step. FIG. 5 is a view showing the stage in which the winding shaft has made one rotation in the electricity generating element winding step. FIG. 6 is a view showing the relation between discharge rate and discharge intermediate voltage.

In this embodiment, a nickel-hydrogen secondary battery using a winding-type electricity generating element will be described. As shown in FIG. 2, this nickel-hydrogen secondary battery is configured so that a battery can 1 houses an electricity generating element 2, is filled with an electrolyte, and sealed up with a battery cover 3 through an insulator. In the case of the nickel-hydrogen secondary battery, a caustic alkali aqueous solution is used as the electrolyte.

As shown in FIG. 1, the electricity generating element 2 is configured so that a positive electrode 4 and a punching metal 5 are brought into contact with each other so as to be attached to each other and wound together with a negative electrode 7 through a separator 6. The positive electrode 4 is configured so that a positive electrode active material mainly containing nickel hydroxide is carried by band-like nickel fiber felt. The punching metal 5 is configured so that a large number of opening holes 5a are formed by pressing in a band-like nickel thin plate slightly wider than the positive electrode 4. Further, the negative electrode 7 is configured so that a negative electrode active material 7a containing a hydrogen-absorbing alloy, etc. is applied, in the form of paste, onto opposite surfaces of a negative electrode punching metal having the same configuration as the punching metal 5 and dried so as to be carried by the negative electrode punching metal. Further, the separator 6 is formed from an insulating band-like nonwoven cloth, or the like, which is transmissible to the electrolyte.

A winding shaft 8 as shown in FIG. 3 is used in a winding step for the electricity generating element 2. The winding shaft 8 is constituted by sectionally-semicircular rod-like bodies which are attached to each other with a slit 8a therebetween. The winding shaft 8 rotates in a state in which the band-like separator 6 is inserted in the slit 8a between the sectionally-semicircular rod-like bodies. Further, the band-like positive electrode 4 and the band-like negative electrode 7 are supplied from opposite sides of the winding shaft 8 so as to be wound through the separator 6. Further, the punching metal 5 is supplied, along the positive electrode 4, from the inner circumferential side of the winding than the positive electrode 4 (from above the positive electrode 4 in FIG. 3 because the winding shaft 8 rotates left). The punching metal 5 is supplied so that the winding start end of the punching metal 5 shifts more rearward by a distance d (which is shorter than one winding along the circumference of the winding shaft 8, about several mm) in the winding direction than the start end of the positive electrode 4. Furthermore, an insulating resin is applied onto a surface (inner circumferential surface) of the punching metal 5 in the side which is not contacted with the positive electrode 4 in the vicinity of the start end portion of the punching metal 5, so that an insulating layer 9 is formed. Incidentally, the insulating layer 9 may be formed from an insulating resin tape stuck to the punching metal 5.

When the winding shaft 8 is rotated, the separator 6 is wound substantially by half circumferences on each half of the winding shaft 8, and then the start ends of the positive electrode 4 and the negative electrode 7 are wound in as shown in FIG. 4. Further, the start end of the punching metal 5 is wound in slightly later than the positive electrode 4. Accordingly, because the outer circumferential side of the start end of the punching metal 5 is covered with the nickel fiber felt of the positive electrode 4, there is no risk that the start end of the punching metal 5 may pierce the separator 6 disposed in the outer circumferential side of the positive electrode 4 and attach the negative electrode 7 to cause short-circuiting. Furthermore, because the inner circumferential side of the start end of the punching metal 5 faces the negative electrode 7 through the separator 6 wound in the form of layers on the winding shaft 8, there is no risk that the start end of the punching metal 5 may contact to the negative electrode 7 to cause short-circuiting even after the winding shaft 8 is drawn out. If the winding shaft 8 is further rotated so that the start end of the negative electrode 7 is put on the inner circumferential surface in the vicinity of the start end portion of the punching metal 5 through the separator 6 in the outer circumferential side as shown in FIG. 5, there is a risk that the start end of the negative electrode 7 containing the negative electrode punching metal as its core may pierce the separator 6 and contact the punching metal 5 as represented by the one-dot chain line in FIG. 5. In the inner circumferential surface in the vicinity of the start end portion of the punching metal 5, however, the aforementioned insulating layer 9 is formed, so that there is no risk that the start end of the negative electrode 7 may contact to the punching metal 5 directly to cause short-circuiting.

Although the winding step has shown the case where the separator 6 of one and the same material is supplied through the slit 8a of the winding shaft 8 and wound on the winding shaft 8 from the opposite sides of the insertion portion of the separator 6, two separators 6 of different materials may be supplied from the opposite sides of the slit 8a respectively. In this case, one separator 6 which contacts to the outer circumferential surface of the positive electrode 4 may be formed from a material thinner than the other separator 6 which contacts to the inner circumferential surface of the punching metal 5. This is because the one separator 6 which contacts to the outer circumferential surface of the positive electrode 4 never contacts to the punching metal 5 so that there is no risk that the one separator 6 is pierced by the start end of the punching metal 5, or the like. When the one separator 6 is made to be thin in the aforementioned manner, there arises an advantage that the size of the battery can be reduced and, accordingly, the positive electrode 4 and the negative electrode 7 can be increased in size correspondingly so that the battery capacity can be increased.

In the aforementioned winding step, the punching metal 5 and the negative electrode 7 are wound while their end edge portions are shifted slightly from each other in the axial direction of the winding shaft 8. Accordingly, as shown in FIG. 2, only the upper edge portion of the punching metal 5 is projected to the upper end side of the electricity generating element 2 whereas only the lower edge portion of the negative electrode 7 is projected to the lower end side of the electricity generating element 2. Accordingly, only by arranging and welding an upper collector plate 10 on the upper end of the electricity generating element 2, the upper collector plate 10 can be connected and fixed easily to the upper edge portion of the punching metal 5. Further, also a lower collector plate 11 can be connected and fixed easily to the lower edge portion of the negative electrode 7 projecting to the lower end side of the electricity generating element 2 in the same manner as described above. Further, these collector plates 10 and 11 are connected to the rear surface of the battery cover 3 and to the inner bottom surface of the battery can 1 respectively through lead pieces, or the like, whereby the center protrusion of the battery cover 3 is used as a positive electrode terminal whereas the bottom surface of the battery can 1 is used as a negative electrode terminal. Incidentally, a rubber valve 3a for discharging gas is attached to the battery cover 3.

According to the nickel-hydrogen secondary battery configured as described above, because the nickel fiber felt of the positive electrode 4 abuts on the punching metal 5 in the substantially whole surface so as to be electrically connected to the punching metal 5, not only the nickel fiber felt makes collection from the positive electrode active material microscopically but also collection can be made macroscopically efficiently by the electrical connection to the punching metal 5. As a result, the voltage drop in the inside of the battery is reduced even at the time of the discharge of a large current. Further, because the upper edge portion of the punching metal 5 projects in the upper end side of the electricity generating element 2, the upper collector plate 10 can be welded now and connected to the positive electrode terminal of the battery cover 3 easily. Furthermore, because the helical upper edge portion of the punching metal 5 projects over the whole length, the upper collector plate 10 can be welded and connected at a large number of points by means of spot welding in a short time. Accordingly, not only electrical resistance between the punching metal 5 and the upper collector plate 10 is reduced but also these can be connected and fixed to each other firmly.

Although the aforementioned embodiment has shown the case where the punching metal 5 is brought into contact with the substantially whole surface of the nickel fiber felt of the positive electrode 4, sufficient electrical connection can be obtained even if the punching metal 5 is brought into contact with from 50% to 100% (preferably, from 75% to 100%) of the surface area of the nickel fiber felt.

Although the aforementioned embodiment has been described about the nickel-hydrogen secondary battery, the present invention may be applied to any battery so long as the battery is that in which the three-dimensional porous body can be used for at least one of the positive and negative electrodes.

Although the aforementioned embodiment has shown the case where nickel fiber felt is used as the three-dimensional porous body of the positive electrode 4, the three-dimensional porous body is not limited thereto and any conductor such as foamed nickel or the like may be used so long as the conductor is a three-dimensionally porous electrical conductor. Furthermore, the kind of the conductor is not limited to nickel but the kind of the conductor may be selected suitably in accordance with the kind of the battery and the kind of the electrodes.

Although the aforementioned embodiment has shown the case where the punching metal 5 formed from a nickel thin plate is used as the conductive thin plate, any conductive thin plate may be used so long as the conductive thin plate has a large number of opening holes having an arbitrary shape and an arbitrary size. For example, it is possible to use a material having macroscopically large opening holes such as an expanded metal, a metal net, or the like, a material having microscopically fine opening holes and formed from a foamed metal or a nonwoven cloth metal compressed in the form of a metal plate, etc. Such opening holes are required for securing ion conductivity from the front surface to the rear surface of the conductive thin plate. Accordingly, if ion conductivity can be sacrificed to some degree, it is not always necessary that the conductive thin plate have opening holes. Furthermore, the kind of the electrical conductor is not limited to such nickel but may be selected suitably in accordance with the kind of the battery and the kind of the electrodes.

If the conductive thin plate such as the punching metal 5, or the like, has opening holes, nickel fiber felt of the positive electrode 4 or the like interpenetrates into the opening holes so that the positive electrode 4 is integrated with the conductive thin plate. When the positive electrode 4 is integrated with the punching metal 5, or the like, as described above, electrical connection between the positive electrode 4 and the punching metal 5 is made more securely so that the punching metal 5, or the like, can be used as a support to make it easy to handle the nickel fiber felt of the positive electrode 4, or the like. In this case, the nickel fiber felt, or the like, may be intentionally pressed to interpenetrates into the punching metal 5, or the like, so that the positive electrode 4 and the punching metal 5, or the like, are integrated with each other when the positive electrode 4 and the punching metal 5, or the like, are brought into contact with each other, or the positive electrode 4 and the punching metal 5, or the like, may be integrated with each other naturally after the battery is assembled. In the winding-type electricity generating element 2 as shown in this mode for carrying out the invention, the positive electrode 4 and the punching metal 5, or the like, are generally tightly wound, so that the nickel fiber felt of the positive electrode 4 interpenetrates into the opening holes 5a of the punching metal 5 to some degree.

Further, the conductive thin plate such as the punching metal 5, or the like, can be designed so that a large number of protrusion portions are formed in its surface. The protrusion portions can be formed from metal powder or metal fiber sintered in the surface of the conductive thin plate or can be formed by metal spraying or rough machining. In this case, the conductive thin plate may have opening holes or may have no opening holes. Further, in the case where opening holes are to be formed by pressing as represented by the punching metal 5, fins produced in the edge portions of the opening holes can be used as the protrusion portions. Because the protrusion portions of the conductive thin plate as described above interpenetrates into the nickel fiber felt of the positive electrode 4 or the like, these are integrated with each other so that electrical connection between the positive electrode 4 and the conductive thin plate is made more securely.

Further, both the contact surfaces of the conductive thin plate such as the punching metal 5, or the like, and the nickel fiber felt of the positive electrode 4, or the like, or either one of the contact surfaces of the same may be coated with a cobalt compound or metal cobalt. When the contact surface is coated with a cobalt compound or metal cobalt as described above, electrical connection can be made more securely. This is because, when the positive electrode 4 is charged, the cobalt compound or metal cobalt is oxidized from bivalence or nullvalence to trivalence or higher oxide. The higher oxide is stable in a caustic alkali electrolyte and, furthermore, in the operating potential of the nickel hydroxide electrode, the higher oxide is not reduced to trivalence or less. Even in the case where the higher oxide is polarized to a lower value from the reversible potential thereof, the higher oxide is not reduced easily. In addition, the higher oxide has the property of high electrical conductivity.

Further, if the conductive thin plate such as the punching metal 5, or the like, is designed so that a lead portion to be led out of the electricity generating element 2 from its end edge portion, the conductive thin plate can be connected to the positive electrode terminal of the battery cover 3 directly by the lead portion without the necessity of projecting the upper edge portion of the conductive thin plate from the upper end side of the electricity generating element 2 and welding the upper collector plate 10 to the upper edge portion. It is a matter of course that the workability in the winding step, or the like, is lowered if such a lead portion is formed in the punching metal 5, or the like. Furthermore, electrical resistance is increased unless thick lead portions are led out from numbers of portions.

Although the aforementioned embodiment has shown the winding-type electricity generating element 2 used in a cylindrical type battery, the present invention can be similarly applied also to a laminate type electricity generating element 2 used in a rectangular pipe type battery, or the like. In the case of a laminate type electricity generating element, a plurality of positive electrodes 4, a plurality of punching metals 5, a plurality of negative electrodes 7 and a plurality of separators 6 each shaped not like a belt but like a flat plate are used.

EXAMPLES

Batteries of the following Examples and Comparative Examples were prepared and compared.

Example 1

Battery: SC type Ni-MH battery
Positive electrode plate size: 188 mm (length)×31.5 mm (width)×0.73 mm (thickness)
Negative electrode plate size: 235 mm (length)×31.5 mm (width)×0.43 mm (thickness)
Electrolyte: 31% by weight of potassium hydroxide aqueous solution dissolving 30 g/l of lithium hydroxide (LiOH)
Nominal capacity: 2.5 Ah
Electrically conductive
thin plate: 188 mm (length)×34 mm (width)×0.06 mm (thickness)
Accordingly, the conductive thin plate abuts on about 100% of the area of the positive electrode plate.

Example 2

Electrically conductive
thin plate: 141 mm (length)×34 mm (width)×0.06 mm (thickness)
Other items are the same as in Example 1.
Accordingly, the conductive thin plate abuts on 75% of the length of the positive electrode plate.

Example 3

Electrically conductive
thin plate: 94 mm (length)×34 mm (width) ×0.06 mm (thickness)
Other items are the same as in Example 1.
Accordingly, the conductive thin plate abuts on 50% of the length of the positive electrode plate.

Comparative Example 1

Positive electrode plate size: 188 mm (length)×31.5 mm (width)×0.76 mm (thickness)
(The active material was removed, and the current collector terminal was welded ultrasonically.)
Conductive thin plate: not used
Other items are the same as in Example 1.

Comparative Example 2

Electrically conductive
thin plate: 47 mm (length)×34 mm (width)×0.06 mm (thickness)
Other items are the same as in Example 1.
Accordingly, the conductive thin plate abuts on 25% of the length of the positive electrode plate.

The rate of production of the battery of Comparative Example 1 by a conventional production method was no more than 5 cells/min. The rate of production of each of the batteries of Inventive Examples 1 to 3, however, was 12 cells/min so that the productivity was improved because the steps of removing the active material and welding the current collector terminal for each electrode could be omitted.

FIG. 6 shows the results of discharging intermediate voltage measured upon the batteries of Examples 1 to 3 and Comparative Example 2 while changing the discharge rate. As the discharge rate in the battery increases, the discharging intermediate voltage decreases because the voltage drop due to the inner resistance of the battery increases. Further, Examples 1 to 3 and Comparative Example 2 are designed so that the ratio of the length of the conductive thin plate to the length of the positive electrode plate becomes smaller in order to be 100%, 75%, 50% and 25%. As this ratio decreases, the resistance between the positive electrode and the conductive thin plate increases. Accordingly, in the batteries of Examples 1 to 3 and Comparative Example 2, the discharging intermediate voltage reduction rate increases as the discharge rate increases. When the ratio of the length of the conductive thin plate is not smaller than 50%, however, the decrease of the discharge intermediate voltage is relatively gentle so that a sufficiently good result is obtained.

As is obvious from the above description, according to the present invention, the three-dimensional porous body of the electrode abuts on the conductive thin plate so as to be electrically connected to the conductive thin plate. Accordingly, collection can be made efficiently through the conductive thin plate. Further, connection to a terminal, or the like, through an end edge portion or lead portion of the conductive thin plate is made easily. Accordingly, because the steps of preliminarily pressing a part of the three-dimensional porous body or removing the active material and welding the current collector for each electrode before winding, or the like, can be omitted, the productivity of the battery can be improved.

Further, because ion conduction is secured through the opening holes of the conductive thin plate, the inner resistance of the battery can be reduced. Further, the three-dimensional porous body of the electrode interpenetrates into the opening holes or the protrusion portions of the conductive thin plate so that not only the electrode is integrated with the conductive thin plate to perform the electrical connection therebetween securely but also the mechanical strength of the three-dimensional porous body can be improved to make it easy to handle the three-dimensional porous body.

Further, the winding start end (start end) of the conductive thin plate is displaced, so that the risk that the start end may pierce the separator so as to cause short-circuit with the other electrode can be eliminated. Further, if an insulating layer is formed in the vicinity of the start end portion of the conductive thin plate, the risk that the other electrode may pierce the separator so as to cause short-circuit with the conductive thin plate can be eliminated.

What is claimed is:

1. An electricity generating element for a battery, the element comprising:

a positive electrode;

a negative electrode, at least one of said positive and negative electrodes comprising a three-dimensional porous body having an active material carried therein;

a separator, said positive and negative electrodes being arranged so as to be adjacent to each other through said separator;

a conductive plate which is arranged to abut on from 50% to 100% of an area of an electrode plate of said electrode comprising the three-dimensional porous body having the active material carried therein, said conductive plate having a projecting portion at one of end edge portions thereof which projects from an end portion of said electricity generating element;

wherein said electricity generating element further comprises a coil in which said positive and negative electrodes are coiled through said separator and arranged helically to be adjacent to each other; and said conductive plate is arranged in a more inner circumferential side of the coil than said electrode on which said conductive plate abuts, and the coil start end of said conductive plate is displaced in a direction opposite the coil direction from the coil start end of said electrode on which said conductive plate abuts.

2. An electricity generating element according to claim 1, wherein an insulating layer is formed on a surface on the inner circumferential side of the coil in the location of the coil start end of said conductive plate.

* * * * *